United States Patent [19]

Sides, Sr. et al.

[11] Patent Number: 4,643,493
[45] Date of Patent: Feb. 17, 1987

[54] TELEVISION CHASSIS

[75] Inventors: Richard J. Sides, Sr., Mount Joy; Christopher L. Crawford, Middletown; Raymond J. Nunweiler, Jr., Lititz; David L. Muth; George P. Hope, both of Lancaster, all of Pa.

[73] Assignee: RCA Corporation, Princeton, N.J.

[21] Appl. No.: 756,829

[22] Filed: Jul. 19, 1985

[51] Int. Cl.⁴ .............................................. A47B 81/06
[52] U.S. Cl. ........................................ 312/7.2; 248/1; 312/257 SK; 312/263; 358/254
[58] Field of Search ............ 312/7.1, 7.2, 263, 257 R, 312/257 SK, 257 A, 257 SM; 211/26, 41; 248/74.5, 74.2, 1 A, 1 C; 24/453, 297, 625; 403/331, 381, 316; 358/254, 255

[56] References Cited

U.S. PATENT DOCUMENTS

| | | | |
|---|---|---|---|
| 2,884,626 | 4/1959 | Fink et al. | 312/7.2 X |
| 2,896,200 | 7/1959 | Aeschliman | 312/7.2 X |
| 2,917,577 | 12/1959 | Harman et al. | 358/254 |
| 2,929,667 | 3/1960 | Jackson | 358/254 |
| 3,154,281 | 10/1964 | Frank . | |
| 3,194,619 | 7/1965 | Dannenberg | 312/7.2 |
| 3,251,939 | 5/1966 | Pestka et al. | 358/254 |
| 3,493,990 | 2/1970 | Winn | 24/625 X |
| 3,531,723 | 9/1970 | Watanabe et al. | 358/254 X |
| 3,572,864 | 3/1971 | Arrington | 312/7.2 |
| 3,572,865 | 3/1971 | Attardi | 312/7.2 |
| 3,703,323 | 11/1972 | Gallas et al. | 312/7.2 |
| 3,771,109 | 11/1973 | Bruckner et al. . | |
| 4,017,129 | 4/1977 | Boldt et al. | 312/7.2 |
| 4,355,921 | 10/1982 | Rousseau | 403/316 |
| 4,369,947 | 1/1983 | Kuwano | 248/74.2 |
| 4,394,054 | 7/1983 | Nieboer | 312/7.2 |
| 4,544,300 | 10/1985 | Lew et al. | 403/381 X |

FOREIGN PATENT DOCUMENTS

| | | | |
|---|---|---|---|
| 2820534 | 11/1979 | Fed. Rep. of Germany | 358/254 |
| 1196930 | 11/1959 | France | 358/254 |
| 1257751 | 2/1960 | France | 358/254 |
| 1392552 | 1/1964 | France | 358/254 |
| 60-51085 | 3/1985 | Japan . | |
| 60-51086 | 3/1985 | Japan . | |
| 652377 | 4/1951 | United Kingdom | 358/254 |
| 2151409A | 7/1985 | United Kingdom . | |

Primary Examiner—Kenneth J. Dorner
Assistant Examiner—Thomas A. Rendos
Attorney, Agent, or Firm—E. M. Whitacre; D. H. Irlbeck; T. H. Magee

[57] ABSTRACT

A plastic television chassis adapted for use in combination with a cathode-ray tube within an enclosure includes a base having integral snap-together parts disposed at opposite ends thereof. A pair of side frames are attached, respectively, to the opposite ends of the base in a substantially orthogonal orientation. Each side frame has integral snap-together parts disposed adjacent a first edge thereof for mating with the snap-together parts of the base, and also has integral slidable-groove parts disposed along a second edge thereof adjacent the first edge. A panel is attached to the side frames by integral slidable-groove parts disposed along opposite sides thereof for mating, respectively, with the slidable-groove parts of the side frames.

16 Claims, 7 Drawing Figures

TELEVISION CHASSIS

BACKGROUND OF THE INVENTION

This invention pertains to a television chassis for use in combination with a cathode-ray tube within an enclosure.

A television chassis comprises a support structure on which electronic components and their associated circuitry are mounted for assembly with a cathode-ray tube in manufacturing television receivers and video monitors. The television chassis is typically a sheet-metal box or frame whose structural parts are assembled to each other using conventional fasteners, such as screws and rivets. Additional fastening hardware is used to assemble the electronic components and associated circuitry, including printed circuit (PC) boards, to the supporting box or frame. Such a chassis utilizes many different types of fastening hardware and is relatively expensive to manufacture and service, due not only to the cost of the hardware itself but also to the difficulty and labor time required to assemble, access and repair the television receiver or monitor.

The present invention provides an improved television chassis which is assembled without the use of conventional fasteners while providing a structurally strong support frame. This chassis is economical to manufacture and assemble, and allows for easy assembly, accessability and servicing. Also, PC boards and other chassis components are easily mounted therein and replaced without the need for additional fastening hardware.

SUMMARY OF THE INVENTION

The present invention comprises a television chassis which includes a base having first integral connecting means disposed at opposite ends thereof. A pair of side frames are attached, respectively, to the opposite ends of the base in a substantially orthogonal orientation. Each side frame has second integral connecting means disposed adjacent a first edge thereof for mating with the first connecting means of the base, and also has third integral connecting means disposed along a second edge thereof adjacent the first edge. A panel is attached to the side frames by fourth integral connecting means disposed along opposite sides thereof for mating, respectively, with the third connecting means of the side frames.

DETAILED DESCRIPTION OF THE PREFERRED EMBODIMENT

Figure 1:
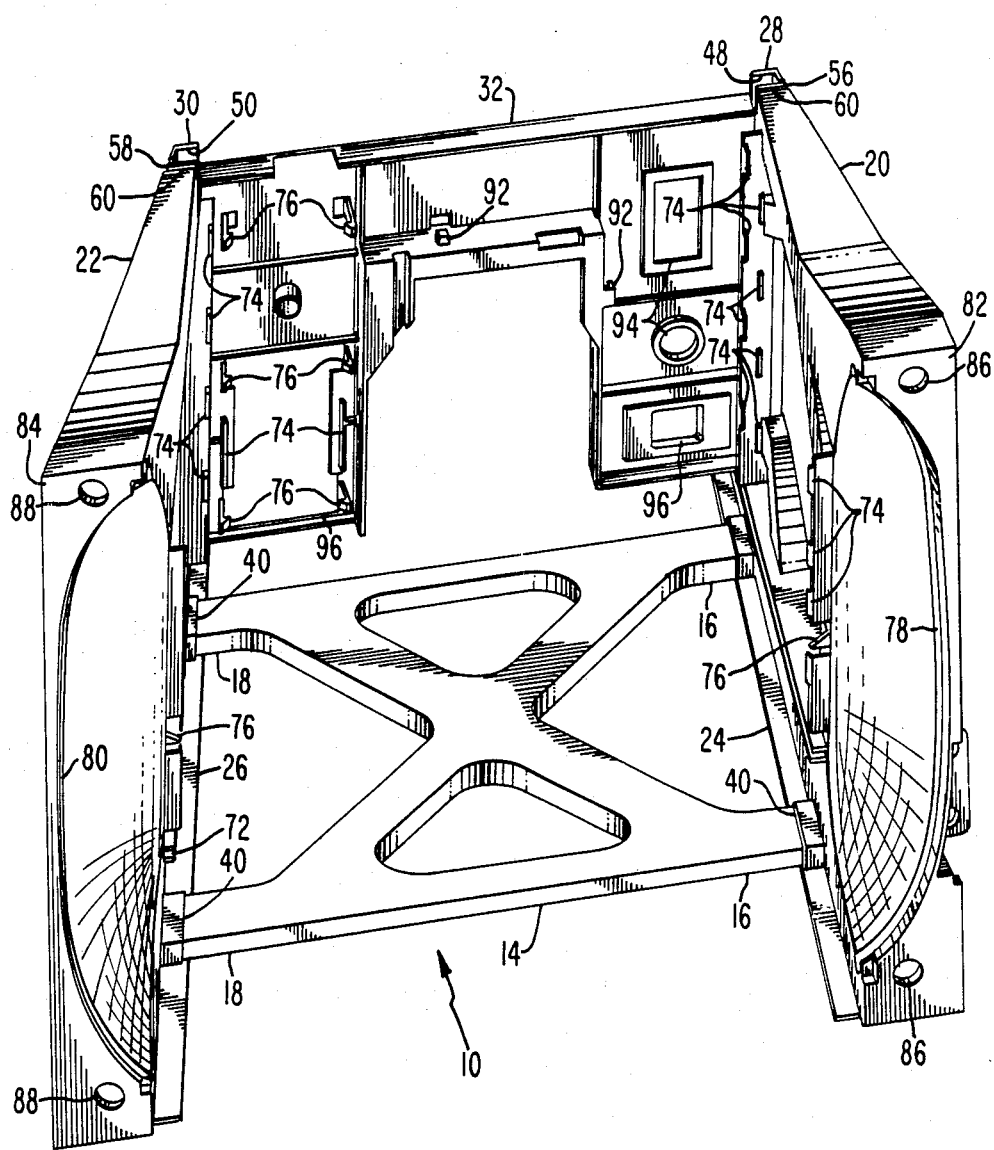
FIG. 1 is a front perspective view of a preferred embodiment of the present television chassis.
Figure 2:
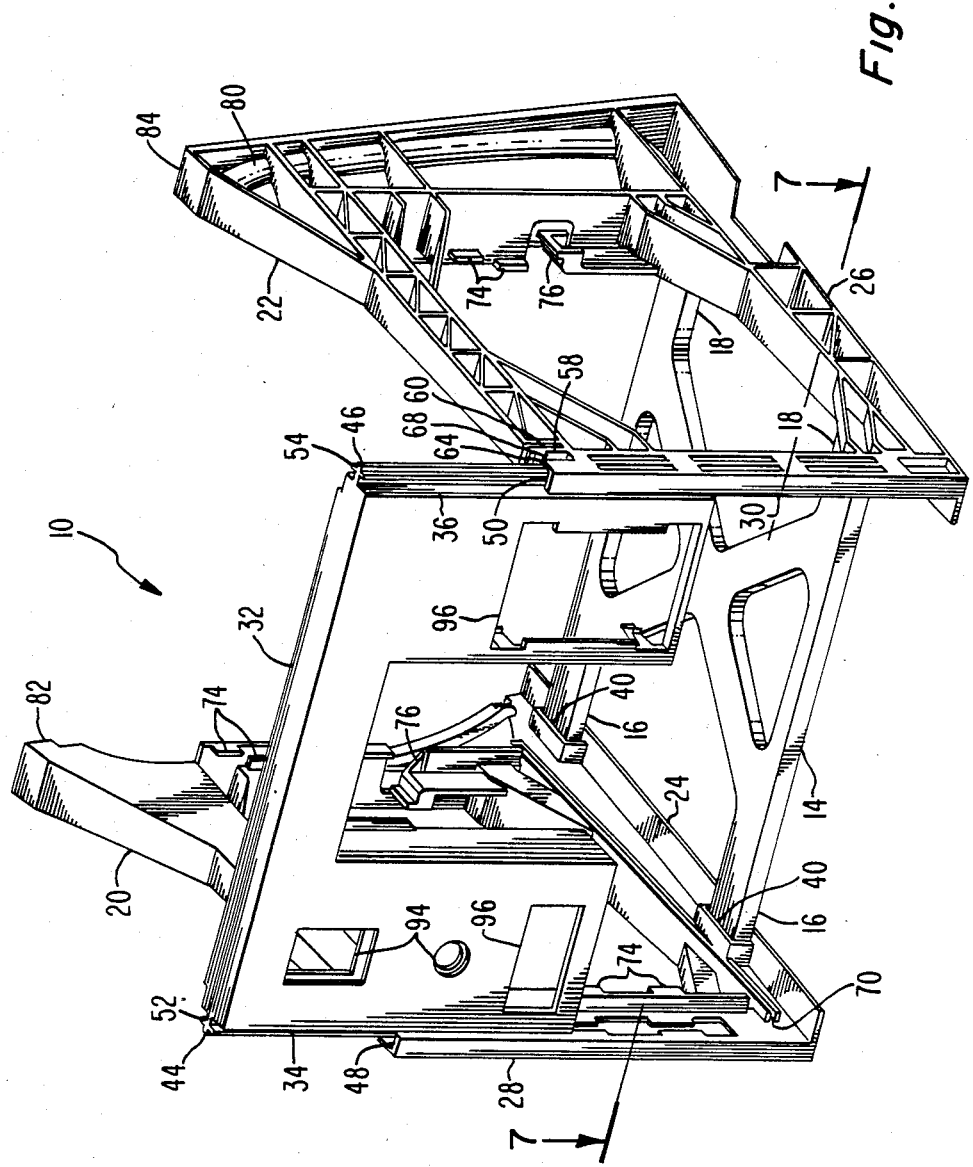
FIG. 2 is a back perspective view of the embodiment of FIG. 1 showing a panel thereof being assembled thereto.

FIGS. 1 and 2 of the drawing show a television chassis 10 adapted for use in combination with a cathode-ray tube 12 (shown by dotted line in FIG. 4) within an enclosure (not shown). The chassis comprises a base 14 having first integral connecting means disposed at opposite ends 16 and 18 thereof. A pair of side frames 20 and 22 are attached, respectively, to the opposite ends 16 and 18 of the base 14 in a substantially orthogonal orientation. The side frames 20 and 22 have second integral connecting means disposed adjacent first edges 24 and 26 thereof, respectively, for mating with the first connecting means of the base 14, and also have third integral connecting means disposed along second edges 28 and 30 thereof adjacent the first edges 24 and 26, respectively. A panel 32 is attached to the side frames 20 and 22 by fourth integral connecting means disposed along opposite sides 34 and 36 thereof for mating, respectively, with the third connecting means of the side frames 20 and 22.

Figure 6:
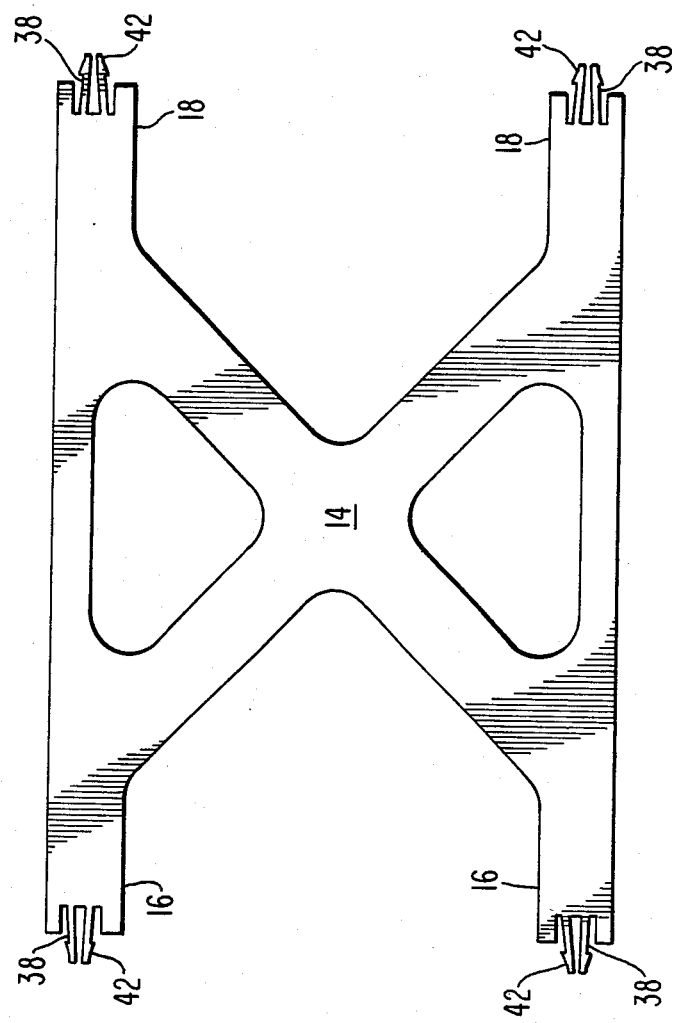
FIG. 6 is a top view of the base of the present embodiment.
Figure 7:
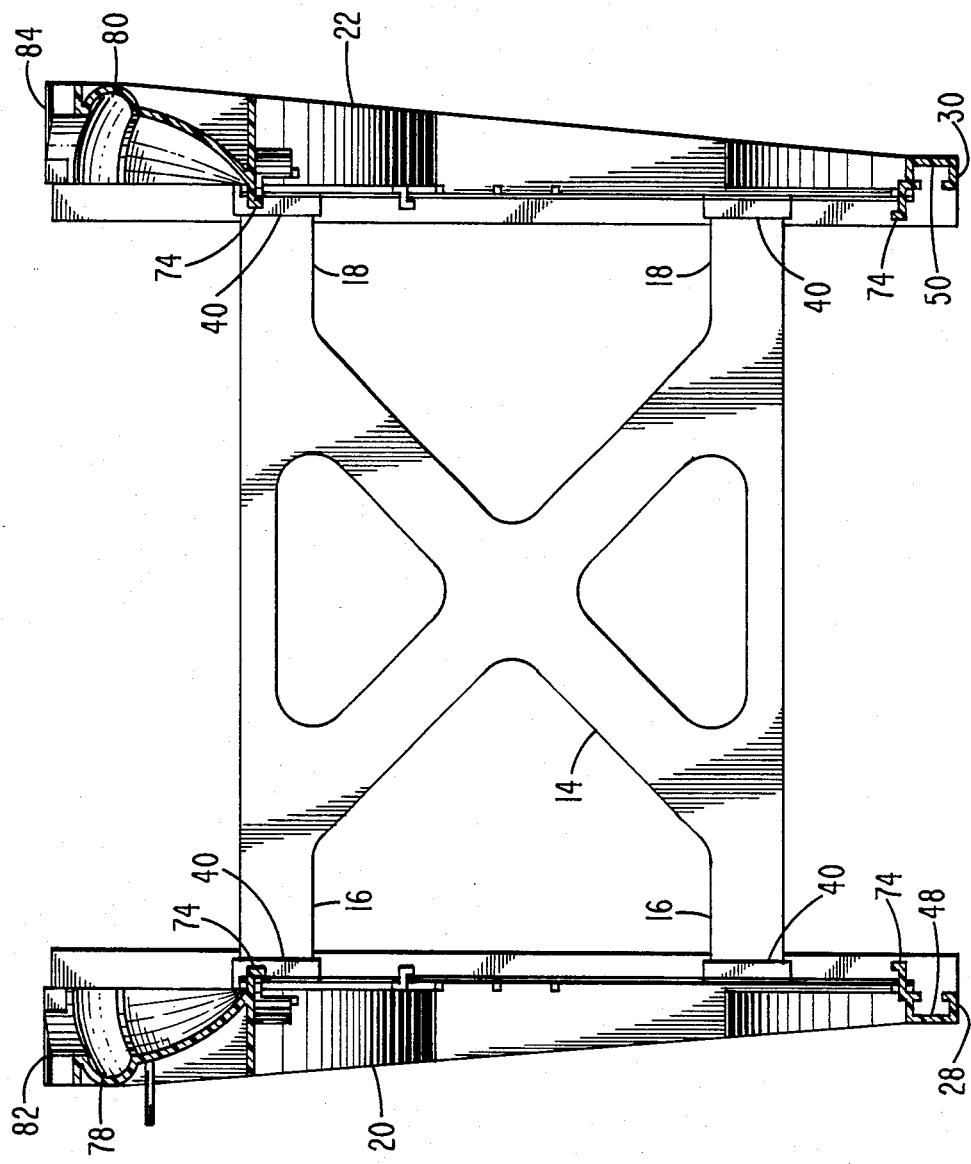
FIG. 7 is a cross-sectional view taken along line 7—7 of FIG. 2.

The first and second integral connecting means comprise snap-together means, and the third and fourth integral connecting means comprise slidable-groove means. The panel 32 is attached to the side frames 20 and 22 by sliding along a direction substantially orthogonal to the base 14. The snap-together means of the base 14 are resilient arrow-shaped pins 38, as shown in FIG. 6. The snap-together means of the side frames 20 and 22 are apertures 40, shown in FIG. 3, which are adapted to receive the pins 38 such that the pins 38 bend during insertion of the heads 42 thereof through the apertures 40 and spring back to form an interlock therewith when the heads 42 have passed through the apertures 40.

Figure 3:
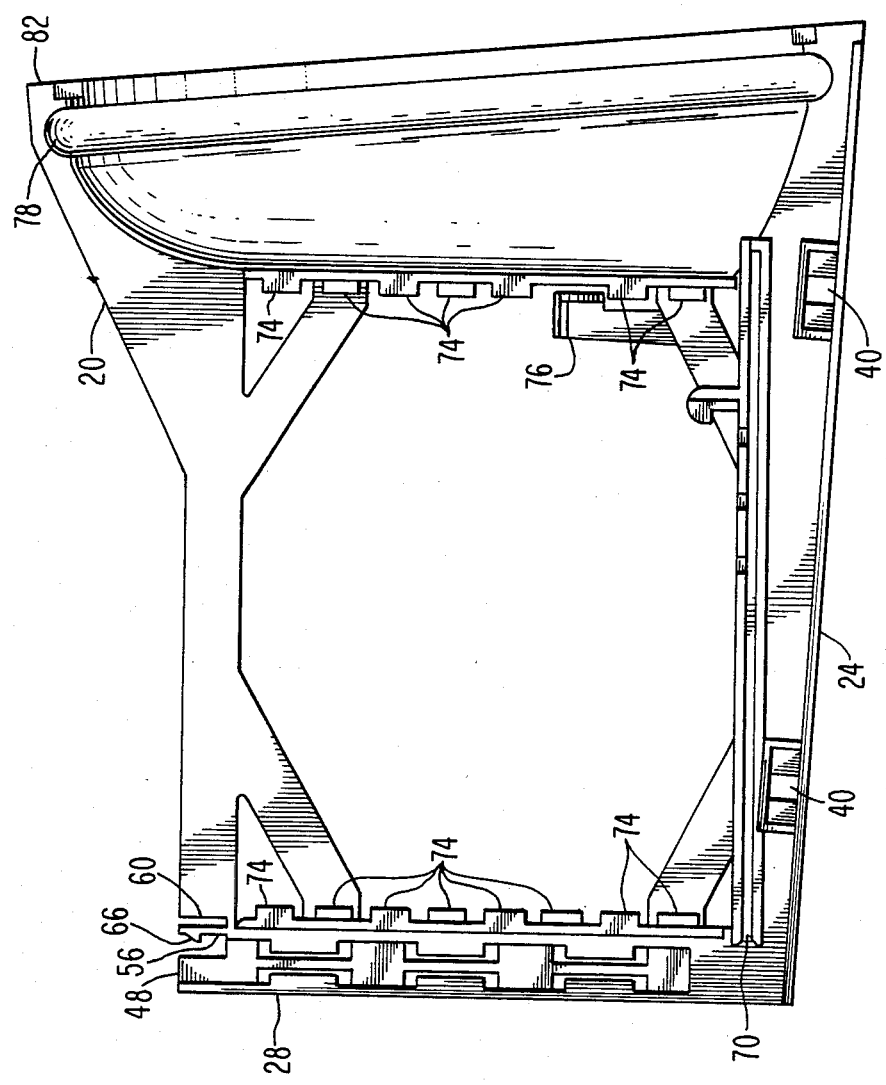
FIG. 3 is an internal elevation view of a side frame of the present embodiment.
Figure 4:
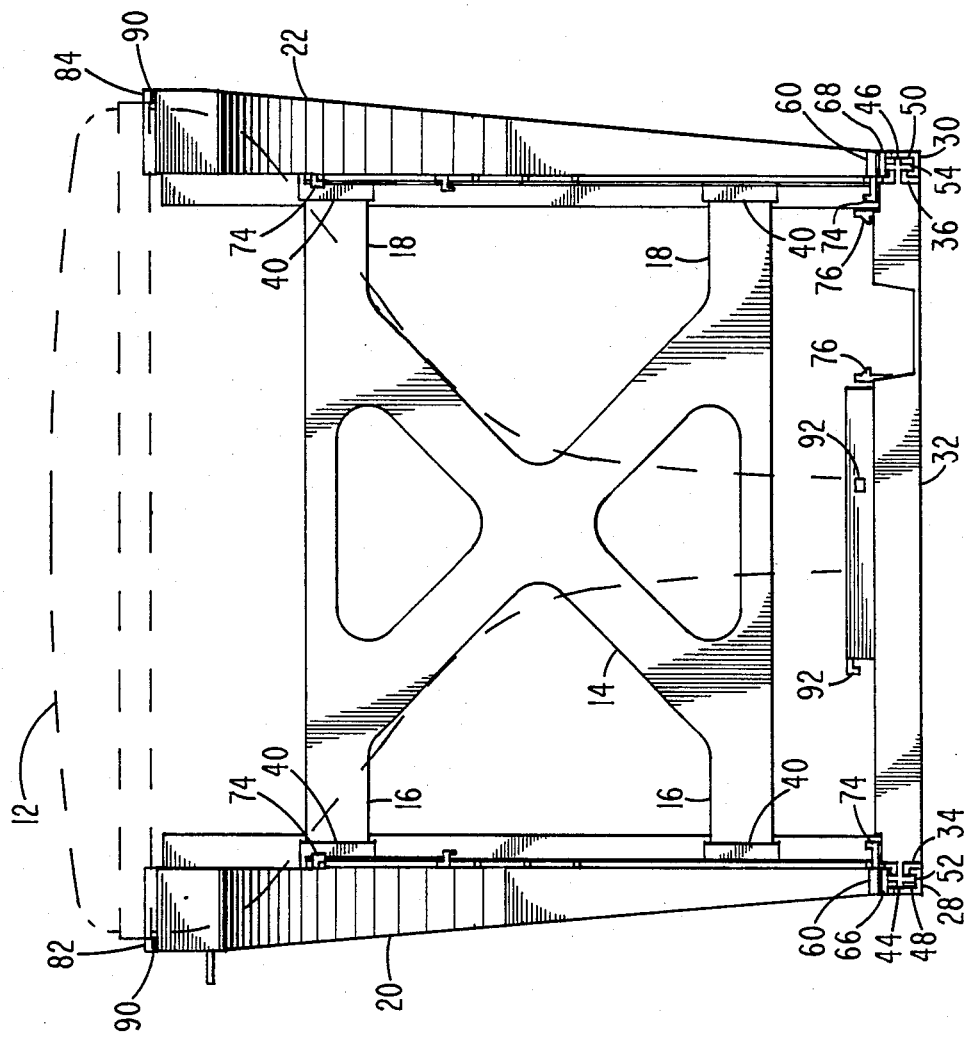
FIG. 4 is a top view of the present embodiment with a cathode-ray tube in place.
Figure 5:
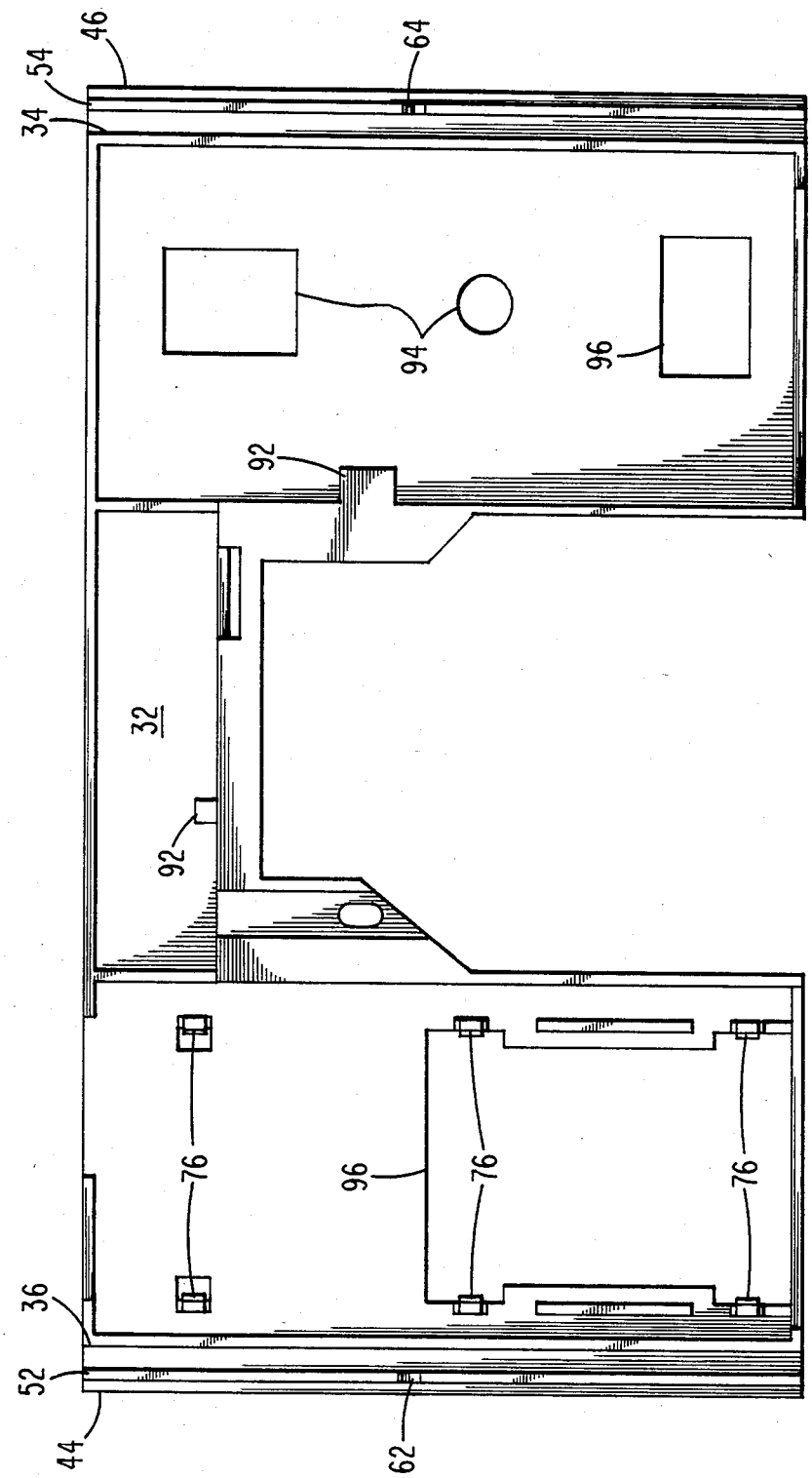
FIG. 5 is an internal elevation view of the panel of the present embodiment.

FIG. 4 shows the slidable-groove means of the panel 32 and side frames 20 and 22. The slideable-groove means of the panel 32 are a pair of substantially T-shaped rails 44 and 46 extending along the slidable direction. The slideable-groove means of the side frames 20 and 22 are a pair of substantially C-shaped guides 48 and 50 extending along the slideable direction such that the crossbar sections 52 and 54 of the rails 44 and 46 slide within and, thereby, interlock with the guides 48 and 50, respectively. The guides 48 and 50 have integral latch means disposed at the ends thereof for locking the rails 44 and 46 at a particular position along the guides 48 and 50. The latch means comprise resilient arrow-shaped pinhalves 56 and 5B, shown in FIGS. 1 and 3, which are positioned such that the crossbar sections 52 and 54 of the adjacent rails 44 and 46 bend the pinhalves 56 and 58, respectively, while sliding within the guides 48 and 50, and then allow the pinhalves 56 and 58 to spring back to form an interlock therewith. Preferably, each of the latch means has a section 60 of the supporting side frame 20 and 22 positioned adjacent thereto, as shown in FIG. 3, so as to contact the back of the pinhalf 56 and 58 when severely bent and stop any further bending, thereby providing an anti-overstress feature to prevent accidental breakage of the pinhalves 56 and 58. In FIG. 5, the crossbar sections 52 and 54 have interlocking grooves 62 and 64 disposed therealong, respectively, to receive the heads 66 and 68 of the pinhalves 56 and 58 and, thereby, lock the adjacent rails 44 and 46 at a midway position for servicing.

The side frames 20 and 22 and the panel 32 of the television chassis 10 also have integral guide means for allowing a printed circuit (PC) board (not shown) to be slid into a predetermined location and supported thereat. Such a guide means includes a pair of longitudinal U-shaped slots 70 and 72 disposed, respectively, on the inside of the side frames 20 and 22 so as to face each other, as shown in FIGS. 1, 2 and 3. In addition, the side frames 20 and 22 and the panel 32 have tab-like projections 74 for supporting PC boards in an orientation substantially parallel thereto. The side frames 20 and 22 and the panel 32 also have integral snap means disposed adjacent the guide means for holding the supported PC board at the predetermined location. Each of the integral snap means comprises a resilient arrow-shaped pin 76 positioned such that the pin 76 bends while the PC board is being slid into location, and then springs back to form a holding interlock therewith when the PC board reaches the predetermined location. Such pins 76 are shown on the side frames 20 and 22 in FIGS. 1, 2 and 3, and are shown on the panel 32 in FIGS. 4 and 5.

The television chassis 10 is made of a plastic material, such as polyvinyl chloride. The side frames 20 and 22, base 14, and panel 32 comprise injection-molded plastic which allows the aforementioned connecting means, guide means, and snap means to be easily formed integrally therewith. In addition, other parts of the chassis 10 may be integrally formed therewith. The side frames 20 and 22 have molded-in cavities 78 and 80, respectively, disposed along third edges 82 and 84 thereof opposite the second edges 28 and 30, as shown in FIGS. 1 through 3 and 7. Such cavities 78 and 80 are adapted to secure degaussing coils (not shown) of the cathode-ray tube therein. The side frames 20 and 22 also have a pair of apertures 86 and 88 disposed therein along the third edges 82 and 84, respectively, for attaching the cathode-ray tube 12 thereto via mounting lugs 90, as shown in FIG. 4. The panel 32 has at least one molded-in hook 92, shown in FIGS. 1 and 5, for securing a wire harness (not shown) thereto. The panel 32 also has locating holes 94 positioned therein for aligning the chassis 10 with respect to the enclosure which will surround the chassis 10, and has openings 96 positioned therein so as to allow clearance for automatic electrical adjustments during final assembly.

An important feature of the present television chassis 10 is the cooperative combination of the snap-together means together with the slidable-groove means to provide a structurally strong support frame which is assembled without the use of conventional fasteners. The base 14 is easily snapped together to the side frames 20 and 22, which are then attached to the panel 32 by sliding the panel 32 along a direction substantially orthogonal to the base 14. This particular arrangement provides a chassis which is not only strong enough to support the cathode-ray tube 12, but also allows for easy accessability and servicing. For example, the entire back panel 32 is easily raised by sliding it to the midway service position, thereby allowing easy access to other chassis components. If desired, the panel 32 and its attached components can be entirely removed and quickly replaced with a different one. Also, PC boards and other chassis components are easily mounted therein and replaced without using fastening hardware. Such a design is also readily adaptable to automatic assembly and testing in the factory using robots. Since the aforementioned connecting means, guide means, and snap means are integrally formed together with the associated sideframes, base and panel, the present chassis is economical to manufacture by an injection-molding process. In addition, other chassis parts may be injection-molded simultaneously therewith to reduce the need for additional fastening hardware.

What is claimed is:

1. A television chassis for use in combination with a cathod-ray tube within an enclosure comprising:
   a base having first integral connecting means disposed at opposite ends thereof,
   a pair of side frames attached, respectively, to said opposite ends of said base in a substantially orthogonal orientation, each side frame having second integral connecting means disposed adjacent a first edge thereof for mating with the first connecting means of said base, and also having third integral connecting means disposed along a second edge thereof adjacent said first edge; and
   a panel attached to said side frames, said panel having fourth integral connecting means disposed along opposite sides thereof for mating, respectively, with the third connecting means of said side frames, said first and said second integral connecting means comprising male-female snap-together means, said third and said fourth integral connecting means comprising slidable-groove means and slidable-tongue means, respectively, said panel being attached to said side frames by sliding along a direction substantially orthogonal to said base.

2. A television chassis as defined in claim 1 wherein the snap-together means of said base comprise resilient arrow-shaped pins, and the snap-together means of said side frames comprise apertures for receiving said pins such that said pins bend during insertion of the heads thereof through said apertures and spring back to form an interlock therewith when the heads have passed through said apertures.

3. A television chassis as defined in claim 1 wherein the slidable-tongue means of sa.id panel comprise a pair of substantially T-shaped rails having a crossbar sections and extending along said slidable direction, and the slidable-groove means of said side frames comprise a pair of substantially C-shaped guides extending along said slidable direction such that the crossbar sections of said rails slide within and, thereby, interlock with said guides, respectively.

4. A television chassis as defined in claim 3 wherein each of said guides have integral latch means disposed at the ends thereof for locking said rails at a particular position along said guides.

5. A television chassis as defined in claim 4 wherein each of said latch means comprises a resilient arrow-shaped pinhalf having a back and positioned such that the crossbar section of the adjacent rail bends said pinhalf while sliding within the guide and then allows said pinhalf to spring back to form a interlock therewith.

6. A television chassis as defined in claim 5 wherein the crossbar section of each rail has an interlocking groove disposed therealong to receive the head of said pinhalf and, thereby, lock the rail at a midway position for servicing.

7. A television chassis as defined in claim 5 wherein each of said latch means has a section of the supporting side frame positioned adjacent thereto so as to contact the back of said pinhalf when severely bent and stop any further bending, thereby providing an anti-overstress feature to prevent accidental breakage of said pinhalves.

8. A television chassis as defined in claim 1 wherein said side frames have integral guide means for allowing a printed circuit board to be slid into a predetermined location and supported thereat.

9. A television chassis as defined in claim 8 wherein said panel has integral snap means for holding a printed circuit board at a predetermined location.

10. A television chassis as defined in claim 9 wherein said integral snap means comprises a resilient arrow-shaped pin positioned such that said pin bends while the printed circuit board is being slid into location and springs back to form a holding interlock therewith when said printed circuit board reaches the predetermined location.

11. A television chassis as defined in claim 1 wherein said base, said side frames, and said panel comprise injection-molded plastic.

12. A television chassis as defined in claim 11 wherein each of said side frames has a molded-in cavity disposed along a third edge thereof opposite said second edge, said cavity for securing a degaussing coil therein.

13. A television chassis as defined in claim 12 wherein each of said side frames has a pair of apertures disposed therein along a third side for attaching said cathode-ray tube thereto via mounting lugs.

14. A television chassis as defined in claim 11 wherein said panel has at least one molded-in hook for securing a wire harness thereto.

15. A television chassis as defined in claim 1 wherein said panel has locating holes positioned therein for aligning said chassis with respect to said enclosure.

16. A television chassis as defined in claim 1 wherein said panel has openings positioned therein so as to allow clearance for automatic final electrical adjustments during final assembly.

* * * * *